(12) United States Patent
Skow

(10) Patent No.: US 6,995,791 B2
(45) Date of Patent: Feb. 7, 2006

(54) AUTOMATIC WHITE BALANCE FOR DIGITAL IMAGING

(75) Inventor: Michael Skow, Mesa, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 688 days.

(21) Appl. No.: 10/115,465

(22) Filed: Apr. 2, 2002

(65) Prior Publication Data

US 2003/0184660 A1    Oct. 2, 2003

(51) Int. Cl.
H04N 9/73    (2006.01)

(52) U.S. Cl. ................ 348/223.1; 348/229.1; 348/254; 348/255; 382/167; 382/168; 358/516; 358/520; 358/522

(58) Field of Classification Search ........... 348/222.1, 348/223.1, 229.1, 254–255, 272, 370; 382/162, 382/164, 167, 168; 358/515–516, 518, 520, 358/522

See application file for complete search history.

(56) References Cited

U.S. PATENT DOCUMENTS

| | | | |
|---|---|---|---|
| 4,646,161 A | 2/1987 | Tsuchiya et al. | |
| 4,942,459 A | 7/1990 | Hieda et al. | |
| 5,216,493 A | 6/1993 | DiBella et al. | |
| 5,361,093 A * | 11/1994 | Yamamoto et al. | 348/223.1 |
| 5,541,649 A * | 7/1996 | Yamamoto et al. | 348/223.1 |
| 5,901,257 A | 5/1999 | Chen | |
| 5,917,556 A | 6/1999 | Katayama | |
| 6,035,077 A | 3/2000 | Chen | |
| 6,487,309 B1 * | 11/2002 | Chen | 382/162 |
| 6,507,667 B1 * | 1/2003 | Hsieh et al. | 382/167 |
| 2001/0004268 A1 | 6/2001 | Kubo | |
| 2001/0006400 A1 | 7/2001 | Kubo | |
| 2001/0012064 A1 | 8/2001 | Kubo | |
| 2001/0012399 A1 | 8/2001 | Tohyama | |
| 2002/0041332 A1 * | 4/2002 | Murata et al. | 348/272 |
| 2002/0081022 A1 * | 6/2002 | Bhaskar | 382/162 |

FOREIGN PATENT DOCUMENTS

| | | |
|---|---|---|
| EP | 0 932 302 A2 | 7/1999 |
| EP | 0940976 A2 | 9/1999 |
| EP | 0969674 A2 | 1/2000 |
| EP | 1102209 A2 | 5/2001 |
| EP | 1111904 A2 | 6/2001 |

* cited by examiner

Primary Examiner—Ngoc-Yen Vu
Assistant Examiner—Carramah J. Quiett

(57) ABSTRACT

In performing automatic white balance of a digital image, a signal is obtained from an image sensor, which represents data corresponding to an image. A plurality of channels is obtained from the signal. A mean value for each of the plurality of channels is determined using a histogram. An average dynamic range is determined from the signal using a histogram. A difference or ratio between one or more of the mean values and the average dynamic range is determined, and that difference or ratio defines a white balance correction. The white balance of the image is then adjusted using the white balance correction.

5 Claims, 2 Drawing Sheets

AUTOMATIC WHITE BALANCE FOR DIGITAL IMAGING

BACKGROUND OF THE INVENTION

1. Field of the Invention

The invention relates generally to the field of digital imaging. More particularly, the invention relates to performing automatic white balance on a digital image.

2. Related Art

As digital imaging becomes more prevalent, technology strives to achieve images and video with better resolution and color accuracy. One aim is to achieve images in which objects that appear white to the human eye are digitally imaged and output to likewise appear white. Although this may at first seem a straightforward task, it has proven to be quite difficult. The difficulty arises, at least in part, because a white object may appear to be one of many "non-white" colors, when viewed by an electronic device, when the object is illuminated by different kinds of light. For instance, if a white object is illuminated under a typical tungsten light bulb, found in everyday lamps, the object may appear to a digital sensor as being yellow or orange. On the other hand, the identical object may appear blue or even green under certain types of fluorescent bulbs. This problem plagues not only digital imaging but conventional, film-based imaging as well. In the realm of film, several manufacturers attempt to correct the orange or yellow cast caused by everyday household lights by using specially formulated "tungsten-balanced" film. Not being based in film, however, digital cameras must procure a different type of solution.

Presently, most consumer digital cameras employ CCD or CMOS sensor(s). Typically, these sensors include a great number of pixels, or picture elements, that register information about the light falling on them. To facilitate the collection of light, many of the sensors employ a small lens-like structure covering each pixel, which is called a microlens. These microlenses are typically made by manipulating a layer of photoresist that is placed upon the pixel plane.

The image sensors used in digital imaging are inherently "grayscale" devices, having no color to them. For this reason, the sensors typically employ a color filter array (CFA) wedged between the microlens and an active portion of the pixel structure, the pixel well. Typically, the CFA is constructed to assign a single color to each pixel. Digital camera manufacturers often choose among a variety of CFA architectures, usually based on different combinations of primary colors (red, green, blue) or complementary colors (cyan, magenta, yellow). Regardless of the particular CFA used, the overall aim is to transfer only a single color of interest, so that each pixel sees only one color wavelength. CFAs also attempt to reduce color artifacts and interference between neighboring pixels, while helping with accurate color reproductions.

One of the most popular and ubiquitous CFAs is called the Bayer Pattern, which places red, green and blue filters over the pixels, in a checkerboard pattern that has twice the number of green squares as red or blue. The theory behind the Bayer Pattern is that the human eye is more sensitive to wavelengths of light in the green region than wavelengths representing red and blue. Therefore, doubling the number of green pixels provides greater perceived luminance and more natural color representation for the human eye.

When subjected to light, an image sensor, which includes a CFA such as the Bayer Pattern, converts incident photons to electrons and is hence within the analog realm. Next, the stored electrical charges arising from the light hitting the sensor's pixels are converted to a stream of voltages via, typically, a built-in output amplifier. This stream of voltages may then be sent to an external or on-chip analog to digital converter (ADC). The ADC converts the various voltage levels to binary digital data, placing the process now within the digital realm. In the DSP, the many points of data may be assembled into an actual image, based on a set of built-in instructions. These instructions include mapping the image sensor data and identifying color and grayscale values of each pixel.

In a single sensor camera using a color filter array, one type of algorithm is called a demosaicing algorithm, which is used to derive color data per pixel. Demosaicing algorithms analyze neighboring pixel color values to determine the resulting color value for a particular pixel, thus delivering a full resolution image that appears as if each pixel's color value was derived from a combination of the red, blue, and green primary colors (if RGB colors are used). Thus, the assembled image can exhibit natural gradations and realistic color relationships.

Other types of algorithms allow the digital data to be further processed to achieve a particular color and intensity (or shade) associated with a specific pixel. Some of these algorithms tend to make pictures warmer (pinkish), while others produce cooler (bluer) results. Some set a default saturation level high, producing extremely bright, sometimes unnatural colors. Others choose a neutral, more realistic saturation, for greater subtlety and color accuracy.

Although such algorithms have shown a degree of utility in rendering fairly accurate color representations, room for significant improvement remains. In particular, conventional techniques and algorithms have not been able to automatically process data such that white objects appear truly white in digital images. Instead, the same problems mentioned above arise—objects illuminated by different types of light tend to have different castings such as orange, yellow, blue, or green.

Making this problem more pronounced is the difficulty in achieving satisfactory white-balance (a term to convey the concept of successfully rendering a white object as white using digital imaging) when faced with different illumination levels. In other words, conventional technology such as that described above has particular problems in achieving white balance when faced with successive scenes of bright and then dim light (and also scenes in which the type of light changes, for example, from tungsten-based bulbs to fluorescent bulbs).

In an attempt to address these shortcomings, some users of digital imaging equipment may turn to post image-acquisition software packages to correct for incorrect color portrayal. In particular, one may use commercially available programs to correct color balance and to ensure that a proper white balance is achieved. This may be accomplished, for example, by choosing one or more particular pixels of an image and manually assigning them a color value approximating true white. The software may then re-map the color values of the other pixels accordingly. These types of corrections can usually be done within the software by referring to, and manipulating, one or more histograms representing color mapping information or by adjusting one or more curves representing such information.

Although these techniques offer the user a great range of flexibility and control in determining the proper white balance of an image, the more post-acquisition corrections that are applied to an image, the more the overall quality of an image may degrade. For instance, heavy post-acquisition processing of an image may introduce unwanted digital artifacts. A similar phenomenon is known to film photographers, who recognize that a better print may be made from a good negative—better than a print made after applying multiple, albeit advanced, manipulations to a mediocre negative.

Based at least on the foregoing, it would be advantageous if users were provided with techniques that would produce an automatic, properly white-balanced image directly from the digital device itself. This image would, in turn, not require much post-acquisition manipulation. Hence, one could obtain better final prints or other forms of output. Additionally, it would also be advantageous if users could avoid undue post-acquisition processing since that processing can often be very time consuming, requiring specialized knowledge that is very software-dependent, and which involves the use of expensive software packages intended to run on high-end computer equipment.

Manufactures of digital equipment have typically attempted to address some, or all of the shortcomings mentioned above by using specific white balance circuitry, which can be activated while a camera images a white card. In other words, manufactures may build functionality that allows a user to point a camera at a white card or white object and effectively "tell" the camera that it is looking at something that is truly white. With that reading, the camera may use its circuitry to attempt to recognize other white objects and render them accordingly.

While this has shown a degree of success, it would be more agreeable to users to use a camera in which the white-balancing was done more automatically. Additionally, it would be desirable to provide white balancing of a digital image, converging on a close approximation of the correct color scene content, in a short period of time under varying illumination conditions.

Any problems or shortcomings enumerated in the foregoing are not intended to be exhaustive but rather are among many that tend to impair the effectiveness of previously known digital imaging and processing techniques. Other noteworthy problems may also exist; however, those presented above should be sufficient to demonstrate that apparatus and methods appearing in the art have not been altogether satisfactory and that a need exists for the techniques disclosed herein.

SUMMARY OF THE INVENTION

Embodiments of the present disclosure address shortcomings mentioned above by providing a new technique for achieving automatic white balancing of digital images, both still and video.

In one embodiment, the invention involves a successive approximation method for performing automatic white balance of a digital image. A signal is obtained from an image sensor. A plurality of color channels are obtained from the signal. A mean value for each of the color channels is determined. A difference between two of the mean values is determined, and that difference defines a white balance correction. The white balance correction is then fed-back to the image sensor, and gain of the image sensor is adjusted correspondingly.

In another embodiment, the invention involves a direct approximation method for performing automatic white balance of a digital image. A signal is obtained from an image sensor. Blue, red, and green channels are obtained from the signal. Mean values for the blue, red, and green channels are determined. The ratio of the mean values of the red and green channels is determined, and that ratio defines a green constant. The ratio of the mean values of the red and blue channels is determined, and that ratio defines a blue constant. A gain of the signal is then adjusted corresponding to the green and blue constants.

In yet another embodiment, the invention involves a method for performing automatic white balance of a digital image. A signal is obtained from an image sensor, which represents data corresponding to an image. A plurality of channels is obtained from the signal. A mean value for each of the plurality of channels is determined using a histogram. An average dynamic range is determined from the signal using a histogram. A difference or ratio between one or more of the mean values and the average dynamic range is determined, and that difference or ratio defines a white balance correction. The white balance of the image is then adjusted using the white balance correction.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof; the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. It should be noted that the features illustrated in the drawings are not necessarily drawn to scale.

DESCRIPTION OF ILLUSTRATIVE EMBODIMENTS

Figure 1:
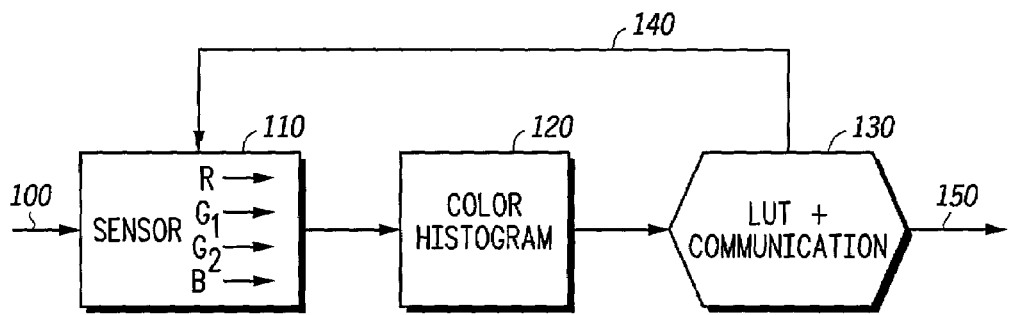
FIG. 1 illustrates a block diagram of a successive approximation (sensor update) white balance method in accordance with embodiments of the present disclosure.

The invention and its various features and advantageous details are explained with reference to non-limiting embodiments and the accompanying drawings.

Embodiments of the present disclosure address shortcomings in the state of the art of digital imaging, such as those mentioned above, by providing methodology whereby effective white balancing is achieved prior to outputting a digital image. In particular, embodiments described herein show how color adjustments may be applied within a device itself; for example, image adjustments may be applied on a CMOS sensor chip or with a CCD sensor chip to achieve automatic white balance.

In different embodiments, white balance corrections may be successively refined over time so that one achieves a more precise color renditions. For example, individual color gains of a sensor may be adjusted for white balancing in response to the taking of a first image. In response to the taking of a second image, those adjustments may be modified and improved. In response to the taking of a third image, further modifications may be made. In this way, one may arrive at an optimal white balance correction scheme. Because the scheme may be applied within the device itself, prior to output, an end user need not worry about undergoing a long series of complicated post-acquisition color corrections that are time consuming, expensive, and potentially deleterious to overall image quality. Outputting an image that is already sufficiently corrected for white balance is analogous to a photographer obtaining a perfectly-exposed and balanced negative—little, or no, post-acquisition darkroom manipulation is required, and thus, a better final image can be printed quickly, efficiently, and cost-effectively. The techniques of this disclosure work equally well under varying illumination conditions, providing even greater flexibility to the user.

Applications for the present disclosure are vast and include any application in which digital imaging and/or processing is involved. Embodiments may be applied to digital still and/or digital video cameras. Techniques of this disclosure are particularly well-suited for white balance correction on a Bayer Patter digital image, although those having skill in the art will recognize that different CFA architectures may be used as well. Embodiments may be applied to digital imaging adapted for use not only in personal photography and videography, but also in medical, astronomy, physics, military, and engineering applications. Embodiments may be applied to devices utilizing one or any number of digital sensors.

Embodiments of this disclosure may be utilized in conjunction with a wide range of imaging systems, including systems that use a complementary metal oxide semiconductor (CMOS) sensor having independent gain amplifiers for each of a set of four Bayer color levels. Embodiments may be utilized in conjunction with CCD sensors as well. Embodiments may also be utilized when an imaging system includes a digital processor that can provide gains to each color. Embodiments may be utilized via one or more computer programs, with an application specific integrated circuit (ASIC), or the like, as will be understood by those having skill in the art.

This disclosure entails at least two main embodiments. One embodiment provides methods and apparatus for a successive approximation technique while another embodiment entails a direct approximation method. Both main embodiments perform automatic white balance on a captured digital image prior to its output. Both embodiments converge on a close approximation of the correct color scene content in a short period of time and reduce or eliminate the need for post-acquisition color correction.

Generally speaking, both main embodiments include a common assumption of a "gray world" model. This means that both main embodiments assume that, for a large area normal image, the mean (or median) of all color information should be approximately neutral, or gray. In RGB color space, this means that the mean values of red, green, and blue should be approximately equal:

$$R_{mean} = G_{mean} = B_{mean}.$$

If differences do exist between the different color channel means (or medians), those differences may be attributed to the spectral response of either (a) the illuminant (light), (b) the CFA spectral response, or (c) some combination of the two. In such a situation, techniques of this disclosure may correct the image back to a gray world model in which $R_{mean}$, $G_{mean}$, and $B_{mean}$ are approximately equal (e.g., within 10% in one embodiment, more preferably within 5%, and even more preferably within 1–2%). In doing so, white objects will appear truly white since extraneous effects of illumination quality are removed; likewise, color reproduction appears more lifelike. For example, the familiar orange cast associated with tungsten-based lamps can be removed, quickly, automatically and prior to the output stage.

Successive Approximation Embodiment

Referring to FIG. 1, a block diagram of a successive approximation (sensor update) method is depicted. A data input 100 is coupled to a sensor block 110. In one embodiment, the sensor block may be a CMOS sensor. In another embodiment, it may be a CCD sensor. In different embodiments, the sensor block 110 may be made of a single, or multiple sensors. For instance, in one embodiment, the sensor block 110 may include three different sensors, each sensor concentrating on a different primary color.

The sensor block 110 is coupled to a color histogram block 120. In one embodiment, the color histogram block 120 may include software and/or hardware functionality that is able to generate one or more histograms from the output of sensor block 110. In particular, assuming an RGB color model, the histogram block 120 may be configured to generate a separate histogram for the red, blue, and green channels output from sensor block 110.

The color histogram block 120 is coupled to a color look-up table (LUT) and communication block 130. Like the color histogram block 120, the color look-up table LUT and communication block 130 may include software and/or hardware functionality. Its function, in one embodiment, is to determine the color corrections and more particularly, automatic white balance corrections in accordance with the description that follows. Specifically, the color LUT may be used to arrive at the particular corrections that need to be made, and it may represent those corrections in terms of one or more coefficient values, matrix values, or the like. The communication portion of the color LUT and communication block 130 denotes the hardware and/or software functionality that feeds back the correction information from the LUT back to the sensor block 110 via feedback signal 140. In one embodiment, this communication may entail a direct connection; in other embodiments, any means of transmission suitable for conveying the correction information may be used.

In operation, the feedback signal 140 may direct the sensor block 110 to adjust, for example, individual gain settings for each color channel in the sensor. For example, if algorithms (described below) indicate that the red channel output should be boosted by some amount, that information is conveyed via feedback signal 140 to the sensor block 110, which may respond by adjusting the gain of the red channel upwards by the particular amount dictated by the correction. The corrected output signal is white balance signal 150, which may be output in any of many manners known in the art including but not limited to writing to a memory device.

The methodology described above may be termed the successive approximation method at least in part because the feedback properties may be iterated as many times as desired before providing a final output. In one embodiment, the successive approximation method may be utilized on a frame-by-frame basis. In other words, taking a first image may establish a first set of automatic white balance corrections, which are fed back to the sensor to adjust its operation. Taking a second image may establish revisions or modifications to that first set of white balance corrections, which are likewise fed back to the sensor. This process may continue, causing the sensor to effectively "learn" its surroundings, allowing it to optimally adjust its gain settings to produce an ideal, white balanced output. In such an embodiment, the camera may provide iteratively better and better pictures, constantly refining its white balance corrections over time. Depending on the application, the initial corrections may be suitable by themselves, with successive modification and revisions only slightly changing (or not changing at all) the original values.

In other embodiments, the successive approximation method may be utilized continuously or semi-continuously even when the camera is not actually generating single frames or video as output. In one embodiment, multiple successive approximations (corrections) may be determined, placed in the LUT, and fed back to the sensor before a snapshot or video is taken. Specifically, the camera may receive light from a scene as soon as a lens cap is removed. At this time, although no image is actually output, light readings may be taken to establish suitable white balance corrections to be stored in the LUT and fed back to the sensor. In this way, before a snapshot or video is even taken, the sensor itself will have already "learned" the appropriate white balance to be applied at sensor block 110.

In all of these embodiments, the user may be assured that he or she will obtain an image output that will require less, or no, additional color and white balance modifications, since those corrections have already been applied to the sensor itself prior to output.

In one embodiment, the particular automatic white balance corrections values stored in the LUT and fed back to the sensor may be determined as follows. Upon receiving data input 100, which may simply be light reflected from the scene of interest, a mean or median value may be calculated for each color plane. If using an RGB color space, this may entail calculating a mean red, blue, and green value for the scene. In one embodiment, the sampled scene may be the entire field of view. In different embodiments, however, one may select a representative portion of the field of view to be sampled. For instance, one may select the lower half of an image so that one may avoid the stark change of lighting typically associated with the horizon, which occurs in a great number of outdoor pictures and video. Those having skill in the art and having the benefit of this disclosure will appreciate that different representative portions of a field of view may be chosen; for instance, areas in which it is thought that the gray world model particularly applies may be chosen for determination of the white balance correction values.

Using the gray world model mentioned above, one embodiment calculates a white balance correction using the red mean value and the blue mean value. Color histogram block 120 may be used in determining these mean values. In this embodiment, the red mean value may be subtracted from the blue mean value:

$$B_{mean} - R_{mean} = \text{correction}$$

to determine both a magnitude and a direction of the white balance correction required to achieve white balance. The color LUT and communication block 130 may then accordingly store the correction using this magnitude and direction. The correction may take the form of a coefficient, a gain value, a matrix value, or the like, as will be understood by those having skill in the art. This correction may then be relayed to the sensor block 110 via feedback signal 140. Based upon the relayed correction value(s), corresponding gains may applied to color channels at sensor block 110. These steps of correcting the gain may be iterated as described above. In this way, the sensor itself may be modified to correct for white balance.

In other embodiments, the magnitude and direction of the white balance correction may be obtained by subtracting mean values of different colors. For instance, any one or more of: $R_{mean} - G_{mean}$, $R_{mean} - B_{mean}$, $G_{mean} - R_{mean}$, $G_{mean} - B_{mean}$, $B_{mean} - G_{mean}$ may be used.

In an alternative embodiment for determining a white balance correction, an image may be separated into separate luminance (Y) and chrominance (C) channels. As is known in the art, $YC_rC_b$ is a standard model for representing this type of channel separation, with $C_b$ representing blue chromaticity and $C_r$ representing red chromaticity. In this color space, the white balance correction may be found by determining the value of the following difference:

$$C_{r\ mean} - \text{midrange} = \text{difference}.$$

where midrange is a chrominance mean or median of the image data, which may be determined using histogram block 120, and $C_{r\ mean}$ is a mean or median value of $C_r$. The chromiance levels in a YCC image space range from the midrange value in both 'positive' (increasing) and 'negative' (decreasing) levels. In one embodiment, the midrange value may have a fixed value of, for instance, 50% of the output maximum value, or the value of 128 in an 8-bit resolution system. If the $C_{r\_mean}$ value is higher than this midrange, the image is too red. If it is less, the image is too blue. Since this assessment generates a relative position on an illuminant curve, a similar $C_b$ measurement is not necessary. Based upon the value for difference, the LUT may store a corresponding correction to be fed back to sensor block 110. For instance, if the value for difference is positive, the LUT may store a corresponding correction to be fed back to sensor block 110 to effectively decrease the red.

Figure 2:
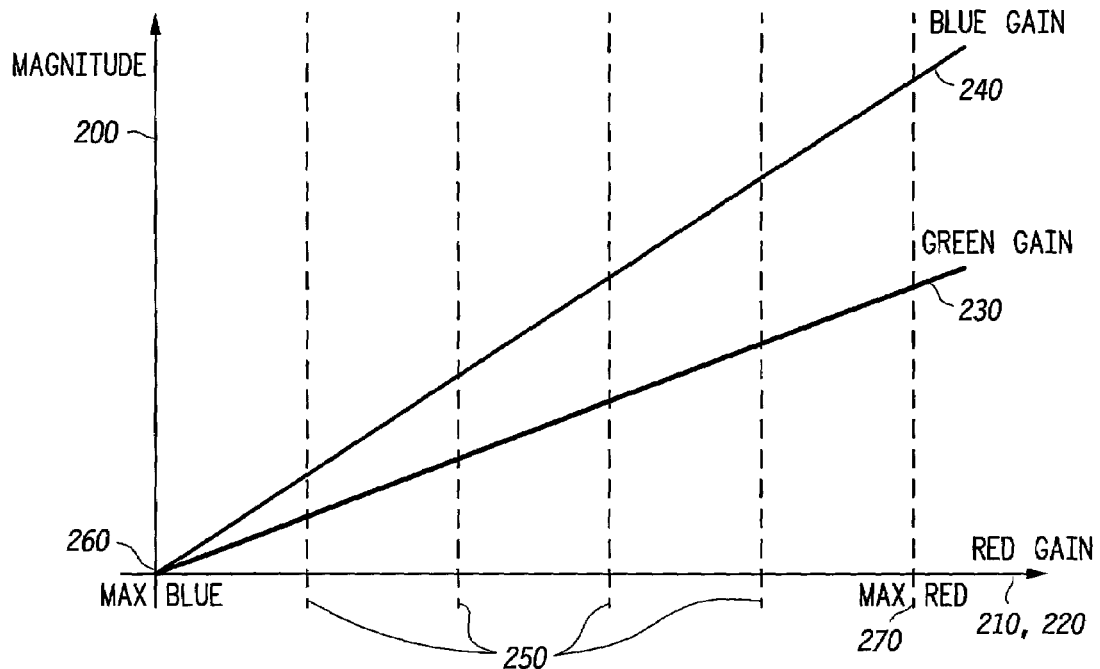
FIG. 2 illustrates color gain concepts in accordance with embodiments of the present disclosure.

In one embodiment, gain coefficients of the sensor block 110 may be driven, according to the difference in values discussed above, but confined to the linear relationship such as the one depicted in FIG. 2. In FIG. 2, a red gain 220, a green gain 230, and a blue gain 240 are plotted against a color gain magnitude axis 200 and a coefficient axis 210. A set of coefficient lines 250 is indicated, along with a maximum blue point 260 and a maximum red line 270. The red gain 220, green gain 230 and blue gain 240 are linear functions. A normal yellow illumination model may be assumed, and white balance correction coefficients may drive the sensor block 110 in a linear manner corresponding to FIG. 2 to achieve white balance.

This embodiment's assumption that the illumination of the scene follows the normal yellow illumination model is, in effect, an assumption that the incident light is some shade of yellow ranging up to white. This model is believed to be accurate for most situations, considering that outdoor and indoor pictures usually involve an illumination source involving some degree of yellow light, ranging from more severe yellow (e.g., tungsten bulbs) to white light (e.g., sunlight). With the benefit of the present disclosure, those having skill in the art will recognize that other illumination models may be assumed and that gain coefficients of sensor block 110 may be adjusted in manner consistent with that model (and the particular color space being used), based upon, for instance, the difference in mean values between red and blue channels (assuming RGB color space).

Direct Approximation Embodiment

Figure 3:
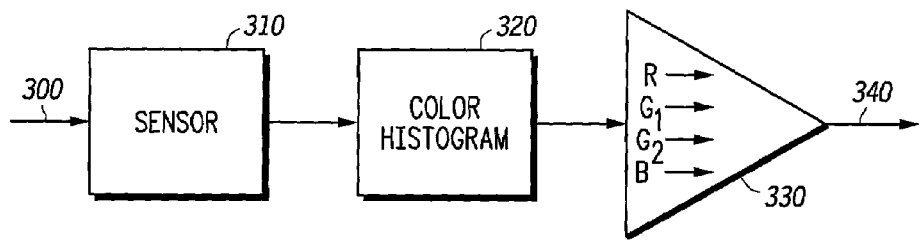
FIG. 3 illustrates a block diagram of a direct approximation (digital processing) white balance method in accordance with embodiments of the present disclosure.

Referring to FIG. 3, a block diagram of a direct approximation method is depicted. A data input 300 is coupled to a sensor block 310. In one embodiment, the sensor block may be a CMOS sensor. In another embodiment, it may be a CCD sensor. In different embodiments, the sensor block 310 may be made of a single, or multiple sensors. For instance, in one embodiment, the sensor block 310 may include three different sensors, each sensor concentrating on a different primary color.

The sensor block 310 is coupled to a color histogram block 320. In one embodiment, the color histogram block 320 may include software and/or hardware functionality that is able to generate one or more histograms from the output of sensor block 310. In particular, assuming an RGB color model, the histogram block 320 may be configured to generate a separate histogram for the red, blue, and green channels output from sensor block 310.

The color histogram block 320 is coupled to a color LUT and digital gain block 330. Like the color histogram block 320, the color LUT and digital gain block 330 may include software and/or hardware functionality. Its function, in one embodiment, is to determine the color corrections, and more particularly the automatic white balance corrections in accordance with the description that follows. Specifically, the color LUT may be used to arrive at the particular corrections that need to be made, and it may represent those corrections in terms of one or more coefficient values, matrix values, or the like. The digital gain portion of the color LUT and digital gain block 330 denotes the hardware and/or software functionality that applies the correction information from the LUT to generate white balance signal 340, which may be output by any of the several means known in the art including but not limited to writing to a memory device.

In operation, digital gain portion of the color LUT and digital gain block 330 may direct the adjustment, for example, of individual gain settings for each color channel. For example, if algorithms (described below) indicate that the red channel output should be boosted by some amount, that information may serve as a digital gain correction for the red channel, which applied by the color LUT and digital gain block 330. The corrected, output signal is white balance signal 340.

The methodology described above may be termed the direct approximation method at least in part because white balance is achieved by directly correcting the signal being output by color histogram block 320. In this embodiment, although the sensor itself is not being corrected, the effective result is same as the successive approximation method because (a) the device as a whole is being corrected and (b) the direct approximation method may also be iterated as many times as desired before providing a final output. In one embodiment, the direct approximation method may be utilized on a frame-by-frame basis. In other words, taking a first image may establish a first set of automatic white balance corrections applied at the color LUT and digital gain block 330. Taking a second image may establish revisions or modifications to that first set of white balance corrections, and this process may continue, causing the device to effectively "learn" its surroundings, allowing it to optimally adjust its gain settings to produce an ideal, white balanced output. In such an embodiment, the camera may provide iteratively better and better pictures, constantly refining its white balance corrections over time. Depending on the application, the initial corrections may be suitable by themselves, with successive modification and revisions only slightly changing (or not changing at all) the original values.

In other embodiments, the direct approximation method may be utilized continuously or semi-continuously even when the camera is not actually generating single frames or video as output. In one embodiment, multiple approximations (corrections) may be determined, placed in the LUT, and implemented in the color LUT and digital gain block 330 before a snapshot or video is taken. Specifically, the camera may receive light from a scene as soon as a lens cap is removed. At this time, although no image is actually output, light readings may be taken to establish suitable white balance corrections to be stored in the LUT. In this way, before a snapshot or video is even taken, the device itself will have already "learned" the appropriate white balance to be applied at sensor block 110.

In all of these embodiments, the user may be assured that he or she will obtain an image output that will require less, or no, additional color and white balance modifications, since those corrections have already been applied to the sensor itself prior to output.

In one embodiment, the particular automatic white balance corrections values stored in the LUT and implemented in the color LUT and digital gain block 330 may be determined as follows. Upon receiving data input 300, which may simply be light reflected from the scene of interest, a mean or median value may be calculated for each color plane. If using an RGB color space, this may entail calculated a mean red, blue, and green value for the scene. In one embodiment, the sampled scene may be the entire field of view. In different embodiments, however, one may select a representative portion of the field of view to be sampled. For instance, one may select the lower half of an image so that one may avoid the stark change of lighting typically associated with the horizon, which occurs in a great number of outdoor pictures and video. Those having skill in the art and having the benefit of this disclosure will appreciate that different representative portions of a field of view may be chosen; for instance, areas in which it is thought that the gray world model particularly applies may be chosen for determination of the white balance correction values.

Using the gray world model mentioned above, one embodiment calculates a white balance correction using multiplicative, ratio constants of the mean values of different color channels. Color histogram block 320 may be used in determining these mean values. In this embodiment, the constants may be:

$$G_{constant} = R_{mean}/G_{mean}; \text{ and}$$

$$B_{constant} = R_{mean}/B_{mean}.$$

In this particular formulation, the red channel is assumed to be the greatest value due to the wide-band color filter of red, but those having skill in the art will understand that this may not always be the case.

These constants may be stored in the color LUT and may take the form of a coefficient, a gain value, a matrix value, or the like, as will be understood by those having skill in the art. In one embodiment, the constants may be used to multiply each pixel of the scent to white balance the image. These steps of correcting the gain may be iterated as described above. In this way, the imaging device itself may be modified to correct for white balance.

In an alternative embodiment for determining a white balance correction, an image may be separated into separate luminance (Y) and chrominance (Cr) channels. As is known in the art, $YC_rC_b$ is a standard model for representing this type of channel separation. In this color space, the white balance correction may be found by determining the value of the following constants:

$$C_{b\ constant} = \text{midrange}/C_{b\ mean}; \text{ and}$$

$$C_{r\ constant} = \text{midrange}/C_{r\ mean}$$

wherein midrange is a chrominance mean or median of the image data, which may be determined using histogram block 320.

As before, these constants may be stored in the color LUT and may take the form of a coefficient, a gain value, a matrix value, or the like, as will be understood by those having skill in the art. In one embodiment, the constants may be used to multiply each pixel of the scent to white balance the image. These steps of correcting the gain may be iterated as described above. In this way, the imaging device itself may be modified to correct for white balance.

Dynamic Range/Histogram Methodology

Figure 4:
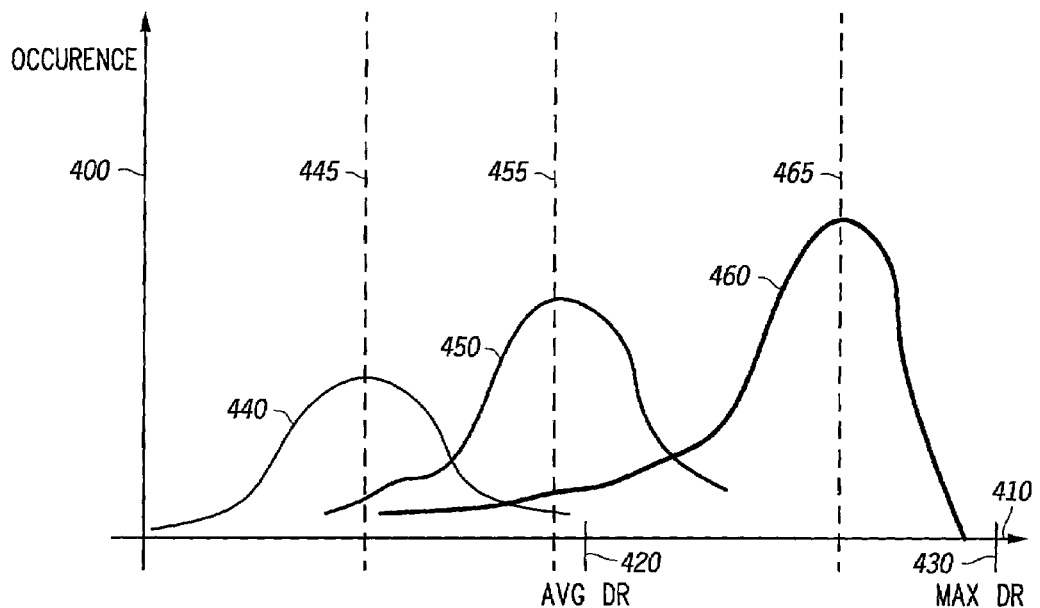
FIG. 4 illustrates histogram concepts in accordance with embodiments of the present disclosure.

Referring to FIG. 4, a histogram is shown. A blue histogram 440, a green histogram 450, and a red histogram 460 are plotted on an occurrence axis 400 and a dynamic range axis 410. An average dynamic range 420 and a maximum dynamic range 430 are indicated on the dynamic range axis 410. A blue mean 445, a green mean 455, and a red mean 465 are also indicated.

Still referring to FIG. 4, an alternative method can be used in conjunction with both the successive approximation method and the direct approximation method. An embodiment of this method includes comparing a color histogram mean or median (e.g., blue mean 445, green mean 455, and red mean 465) to a center point of the color dynamic range (e.g., average dynamic range 420). For instance, in one embodiment, a difference between red mean 465 and average dynamic range 420 may be used to derive a white balance correction value to be stored in a LUT in conjunction with either of the embodiments described above. Alternatively, a difference between blue mean 445 and average dynamic range 420 may be used. Still alternatively, a difference between green mean 455 and average dynamic range 420 may be used. As taught above, these differences may be used to form a white balance correction, and these corrections may be confined to an appropriate illumination model such as the yellow illumination model (see FIG. 2). This methodology is not limited to use of average dynamic range 420. In one embodiment, differences between different color channel means and the maximum dynamic range 430 may be used to arrive at an appropriate white balance correction.

In another embodiment, ratios between the color plane averages may be used to drive gain coefficients, confined by a yellow illumination or other similar model. In yet another embodiment, such ratios may be used to create multiplicative constants for each color plane in a direct approximation method.

The following examples are included to demonstrate specific embodiments of this disclosure. It should be appreciated by those of ordinary skill in the art that the techniques disclosed in the examples that follow represent techniques discovered by the inventor to function well in the practice of the invention, and thus can be considered to constitute specific modes for its practice. However, those of ordinary skill in the art should, in light of the present disclosure, appreciate that many changes can be made in the specific embodiments which are disclosed and still obtain a like or similar result without departing from the spirit and scope of the invention.

EXAMPLES

Assume that an image has been captured by an Bayer Pattern RGB image sensor, and must undergo the process of automatic white balance.

The captured image, if perfectly white balanced (according to a "gray world" model) would have the average of each color (red, green and blue) equal. This is typically not the case due to effects from the illuminant source, color filter attenuation, and filtering elements within the optics (e.g. infrared stop band filters). In the case of these examples, assume that Red(mean) is relatively high, Blue(mean) is relatively low, and Green(mean) is in-between those values. This type of output is consistent with many man-made illuminant sources, such as incandescent light.

For the purpose of these examples, assume an 8-bit data system. The output values in this system will range from 0 to 255, with higher values indicating more luminous intensity. In a sample image taken in this example, the mean Red, Green and Blue values may be calculated from collected raw sensor data. Assume that these are: Red(mean)=200, Green(mean)=150, and Blue(mean)=100.

In one embodiment, a goal may be to successively approximate the values of two of the color channels to make them eventually equal to the third channel. Once each of the color channels are equal (within some allowable error), the system will be white balanced. In this case, assume that the successive value to approach is the highest of the three (Red). As the value of Green(mean) is compared to the Red(mean) (by a subtractive difference), it is determined that the delta is −50. This indicates that a moderate gain increase is necessary in the Green gain channel for the next image to be collected, which will increase the values for all Green sensor elements, and the mean value for all Greens as well. A similar comparison of the Blue(mean) to the Red(mean) will yield a large difference, 100. This indicates that a large gain increase in the Blue channel is needed for the next image.

Each new frame of data may be analyzed as the previous frame was. If the value of the Green or Blue channel (means) exceeds the Red(mean), gain may be reduced. If it is smaller, gain may be increased. The process assumes that two fixed increases and two fixed decreases are possible, one for large relative differences, and the other for small relative differences. Such a process has the advantage that each image may become progressively more accurate in color value, more immune to changes in environment from image to image, and does not require knowledge of the exact gain or linearity of the amplifier that it is controlling.

In another embodiment, a fixed color table may be used to create new coefficients for the color. A similar comparison method may be used, where the Red(mean) is compared to the Blue(mean) value. But, in this case, the comparison may take the form of a ratio (quotient). The ratio may then compared to a fixed table of values that correspond to gain values for Red, Green and Blue values. This table should be created in advance by capturing raw sensor images of known gray content and illuminant level. The ratio value will correspond to gain levels that are appropriate to the specific color sensor, optics, filters and illuminant based on the known samples captured.

In one embodiment, one may choose to look at the illuminant ratio of Red(mean)/Blue(mean). With the assumptions of these examples in place, this ratio would be the even value of 2. Our example lookup table for 2 may correspond to incandescent light, and have three color gains associated with the value to use in the next image frame. These color gains, for this example might be 2.0 for Blue, 1.33 for Green and 1.0 for Red. Other light sources may be selected by the table as the ratio value changes to higher or lower. If the ratio increases, it would indicate that the light source was more yellow (possibly from Mercury vapor lamps in this case), and if it was lower, it might indicate the light source was less yellow (such as from fluorescent lamps).

The individual components described herein need not be made in the exact disclosed forms, or combined in the exact disclosed configurations, but could be provided in virtually any suitable form, and/or combined in virtually any suitable configuration.

Further, although the method of performing automatic white balance described herein can be a separate module, it will be manifest that the method of performing automatic white balance may be integrated into any system with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept, which is defined by the appended claims and their equivalents in the context of this disclosure.

The appended claims are not to be interpreted as including means-plus-function limitations, unless such a limitation is explicitly recited in a given claim using the phrase(s) "means for" and/or "step for."

What is claimed is:

1. A direct approximation method for performing automatic white balance of a digital image, comprising:
    obtaining a signal from an image sensor;
    obtaining luminance and red and blue chrominance channels from the signal;
    determining mean values for the red and blue chrominance channels;
    obtaining a midrange value of the image;
    determining the ratio of the mean value of the blue chrominance channel and the midrange value, the ratio defining a first chromaticity constant;
    determining the ratio of the mean value of the red chrominance channel and the midrange value, the ratio defining a second chromaticity constant; and
    adjusting a gain of the signal corresponding to the first and second chromaticity constants.

2. The method of claim 1, wherein the method is performed iteratively to refine the gain.

3. The method of claim 1, wherein adjusting the gain comprises linearly driving one or more sensor coefficient according to a yellow illumination model.

4. An imaging device configured to implement the method of claim 1.

5. An application specific integrated circuit configured to implement the method of claim 1.

* * * * *